(12) United States Patent
Hsieh et al.

(10) Patent No.: US 11,714,346 B2
(45) Date of Patent: Aug. 1, 2023

(54) ILLUMINATION SYSTEM AND PROJECTION DEVICE

(71) Applicant: Coretronic Corporation, Hsin-Chu (TW)

(72) Inventors: Wan-Ting Hsieh, Hsin-Chu (TW); Chen-Wei Fan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/534,338

(22) Filed: Nov. 23, 2021

(65) Prior Publication Data

US 2022/0171277 A1 Jun. 2, 2022

(30) Foreign Application Priority Data

Nov. 27, 2020 (CN) .......................... 202011353154.0

(51) Int. Cl.
G03B 21/20 (2006.01)
G03B 33/08 (2006.01)

(52) U.S. Cl.
CPC ........... *G03B 33/08* (2013.01); *G03B 21/204* (2013.01); *G03B 21/208* (2013.01)

(58) Field of Classification Search
None
See application file for complete search history.

(56) References Cited

U.S. PATENT DOCUMENTS 6,467,910 B1 10/2002 Sato
2016/0026076 A1 1/2016 Hu
(Continued)

FOREIGN PATENT DOCUMENTS

CN 103424971 12/2013
CN 104641289 5/2015
(Continued)

OTHER PUBLICATIONS

"Search Report of Europe Counterpart Application", dated Apr. 11, 2022, p. 1-p. 8.
(Continued)

*Primary Examiner* — Bao-Luan Q Le
*Assistant Examiner* — Danell L Owens
(74) *Attorney, Agent, or Firm* — JCIPRNET

(57) ABSTRACT

An illumination system and a projection apparatus are provided. The illumination system includes an excitation light source, a light guiding element, a filter module, an optical wavelength conversion module, and a homogenizing element. The light guiding element reflects an excitation beam coming from the excitation light source. The filter module includes a filtering region and receives the excitation beam reflected by the light guiding element. The optical wavelength conversion module includes a wavelength conversion region, receives the excitation beam reflected by the filtering region and reflects a conversion beam converted from the excitation beam. The conversion beam forms at least one color beam after passing through the filtering region of the filter module. The homogenizing element receives the excitation beam coming from the filter module and the at least one color beam. An incident angle of the excitation beam on the light guiding element is θ1, and θ1>0°.

19 Claims, 6 Drawing Sheets

(56) References Cited

U.S. PATENT DOCUMENTS

| | | |
|---|---|---|
| 2017/0269462 A1 | 9/2017 | Maeda |
| 2020/0019049 A1* | 1/2020 | Liu ...................... G03B 21/204 |
| 2022/0057063 A1* | 2/2022 | Chen ...................... F21S 45/47 |

FOREIGN PATENT DOCUMENTS

| | | |
|---|---|---|
| CN | 107193178 | 9/2017 |
| CN | 207817393 | 9/2018 |
| CN | 110703552 | 1/2020 |
| CN | 114488671 | 5/2022 |
| WO | 2020153573 | 7/2020 |

OTHER PUBLICATIONS

"Office Action of China Counterpart Application", dated Jan. 18, 2023, p. 1-p. 10.

* cited by examiner

ILLUMINATION SYSTEM AND PROJECTION DEVICE

CROSS-REFERENCE TO RELATED APPLICATION

This application claims the priority benefit of China application serial no. 202011353154.0, filed on Nov. 27, 2020. The entirety of the above-mentioned patent application is hereby incorporated by reference herein and made a part of this specification.

BACKGROUND

Technical Field

This disclosure relates to an optical apparatus and an optical system, and in particular to a projection apparatus and an illumination system.

Description of Related Art

In a conventional projection apparatus, an excitation beam is first transmitted to an optical wavelength conversion module through a beam splitting element, multiple lenses, and multiple mirrors, and then the optical wavelength conversion module converts the excitation beam into a conversion beam, and the conversion beam is then transmitted back through the beam splitting element and other lenses to a filter module. As too many optical components are included in the illumination system, this leads to difficulty in assembly, poor accuracy, and difficulty in size reduction.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides an illumination system and a projection device, which helps to reduce the number of optical elements.

Other objectives and advantages of the disclosure may be further understood from the technical features disclosed in the disclosure.

In an embodiment of the disclosure, an illumination system is configured to provide an illumination beam. The illumination system includes an excitation light source, a light guiding element, a filter module, an optical wavelength conversion module, and a homogenizing element. The excitation light source is configured to emit an excitation beam. The light guiding element is disposed on a transmission path of the excitation beam coming from the excitation light source and is configured to reflect the excitation beam coming from the excitation light source. The filter module includes a filtering region and is disposed on a transmission path of the excitation beam reflected by the light guiding element. The optical wavelength conversion module includes a wavelength conversion region and is disposed on a transmission path of the excitation beam reflected by the filtering region of the filter module. The wavelength conversion region of the optical wavelength conversion module is configured to convert the excitation beam into a conversion beam and reflect the conversion beam. A wavelength of the conversion beam is different from a wavelength of the excitation beam. The homogenizing element is disposed on a transmission path of the excitation beam that has passed through the filter module. The conversion beam coming from the optical wavelength conversion module forms at least one color beam after passing through the filtering region of the filter module. The homogenizing element is disposed on a transmission path of the at least one color beam. An incident angle of the excitation beam on the light guiding element is θ1, and θ1>0°. The excitation beam and the at least one color beam constitute the illumination beam.

In an embodiment of the disclosure, a projection apparatus includes the illumination system, a light valve, and a projection lens. The light valve is disposed on a transmission path of the illumination beam and converts the illumination beam into an image beam. The projection lens is disposed on a transmission path of the image beam.

Based on the above, the embodiments of the disclosure have at least one of the following advantages or effects. In the illumination system and the projection apparatus according to the embodiment of the disclosure, the excitation beam coming from the excitation light source may first be transmitted to the filter module through the reflection of the light guiding element, and then transmitted to the optical wavelength conversion module through the reflection of the filtering region of the filter module, where it is converted into the conversion beam by the optical wavelength conversion module. The conversion beam is transmitted to the filtering region of the filter module through the reflection of the optical wavelength conversion module and forms the at least one color beam after passing through the filtering region of the filter module. Since the number of the optical elements included in the illumination system can be effectively reduced, at least one of the difficulty in assembly, poor accuracy, and difficulty in size reduction may be improved.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting.

On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
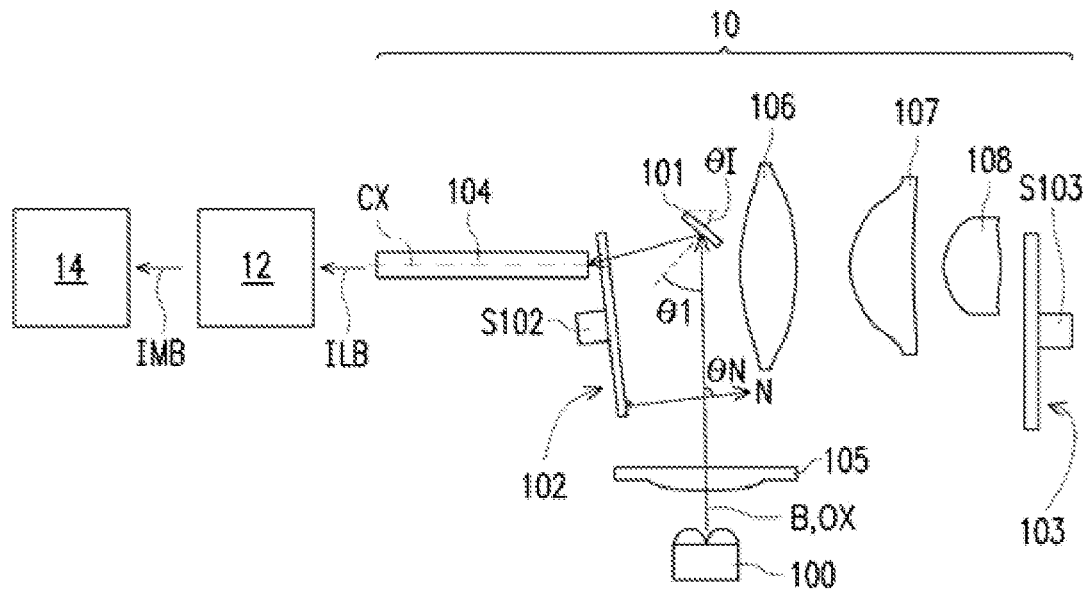
FIGS. 1A and 1B are respectively schematic top views of a projection apparatus according to a first embodiment of the disclosure in different time periods.
Figure 1B:
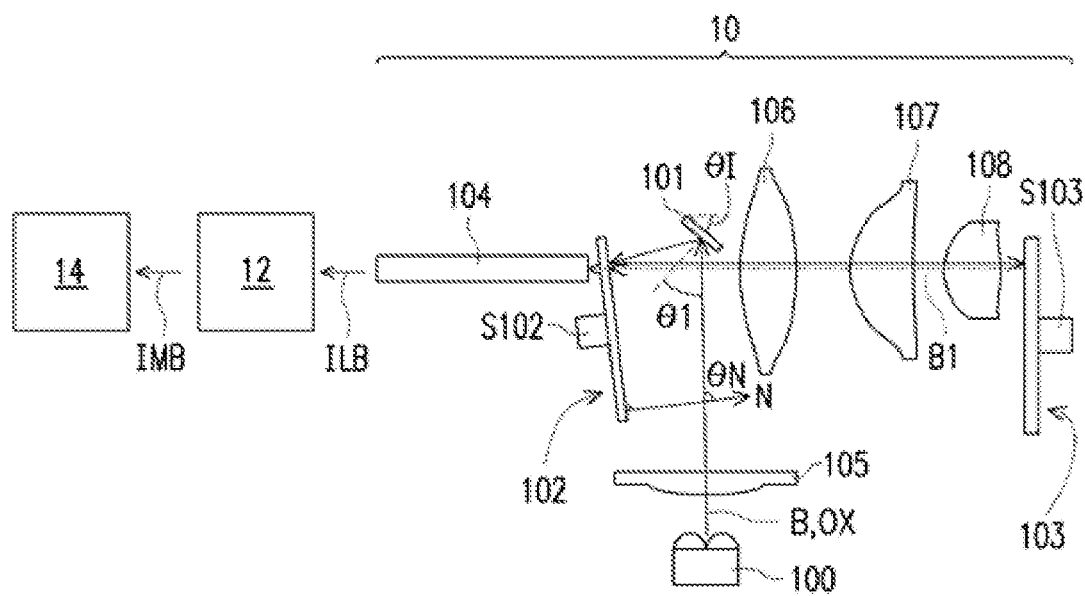
Figure 1C:
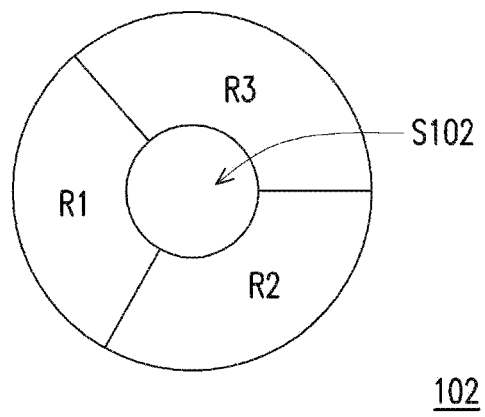
FIGS. 1C and 1D are respectively schematic front views of a filter module and an optical wavelength conversion module in FIG. 1A.
Figure 1D:
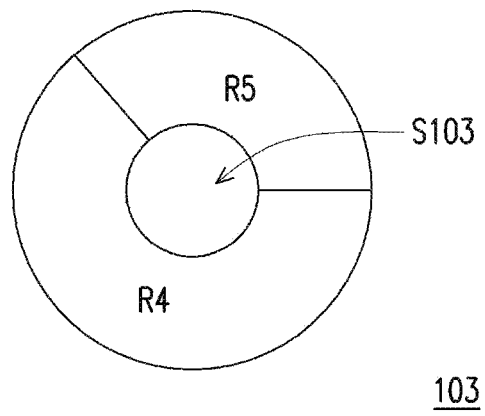

FIGS. 1A and 1B are respectively schematic top views of a projection apparatus according to a first embodiment of the disclosure in different time periods. FIGS. 1C and 1D are respectively schematic front views of a filter module and an optical wavelength conversion module in FIG. 1A. With reference to FIGS. 1A to 1D, a projection apparatus 1 according to the first embodiment of the disclosure may include an illumination system 10, a light valve 12, and a projection lens 14.

The illumination system 10 is configured to provide an illumination beam ILB. In detail, the illumination system 10 may include an excitation light source 100, a light guiding element 101, a filter module 102, an optical wavelength conversion module 103, and a homogenizing element 104. The excitation light source 100 is configured to emit an excitation beam B. For example, the excitation light source 100 includes multiple light-emitting elements. The multiple light-emitting elements may include multiple laser diodes, multiple light-emitting diodes, or a combination of the above two light-emitting elements.

The light guiding element 101 is disposed on a transmission path of the excitation beam B coming from the excitation light source 100, and the light guiding element 101 is disposed obliquely with respect to the excitation light source 100, to enable an incident angle θ1 of the excitation beam B on the light guiding element 101 to be greater than 0° (that is, θ1>0°). For example, 0°<θ1<45°, and an inclined angle θI of the light guiding element 101 is greater than 0° and less than 45°, but it is not limited thereto. The light guiding element 101 reflects the excitation beam B coming from the excitation light source 100. For example, the light guiding element 101 may include a mirror, a prism, a color separation element, or any element that is capable of reflecting the excitation beam B. Moreover, the light guiding element 101 is disposed obliquely with respect to a transmission direction of the excitation beam B emitted from the excitation light source 100 to the light guiding element 101.

The filter module 102 is disposed on the transmission path of the excitation beam B reflected by the light guiding element 101. As shown in FIG. 1C, the filter module 102 may include a filtering region R1, a filtering region R2, and a light penetration region R3. However, the number of filtering regions or light penetration regions may be changed according to requirements and is not limited thereto.

The filtering region R1, the filtering region R2, and the light penetration region R3 are disposed along a circumferential direction of the filter module 102 to surround a rotation shaft S102 of the filter module 102. The filter module 102 is configured to rotate around the rotation shaft S102, so that the filtering region R1, the filtering region R2, and the light penetration region R3 alternately cut into the transmission path of the excitation beam B reflected by light guide element 101. The filtering region R1 and the filtering region R2 reflect the excitation beam B and allowing at least one color beam other than the excitation beam B (such as a blue beam) to pass through. For example, the filtering region R1 is a red filter region which reflects the excitation beam B and allows a red beam to pass through, and the filtering region R2 is a green filter region which reflects the excitation beam B and allows a green beam to pass through. The filtering region R1 may be disposed with a coating that reflects the excitation beam B and a red filter that allows the red beam to pass through. The filtering region R2 may be disposed with a coating that reflects the excitation beam B and a green filter that allows the green beam to pass through. The light penetration region R3 allows the excitation beam B to at least partially or fully pass through. For example, the light penetration region R3 may be disposed with a blue filter or without any filter. In some embodiments, the light penetration region R3 may be disposed with an anti-reflection layer to decrease light loss caused by interface reflection, or the light penetration region R3 may be disposed with a diffusion layer to reduce speckle phenomenon of the laser.

The optical wavelength conversion module 103 is disposed on a transmission path of the excitation beam B reflected by the filtering regions (the filtering region R1 or the filtering region R2 as shown in FIG. 1C) of the filter module 102. As shown in FIG. 1D, the optical wavelength conversion module 103 may include a wavelength conversion region R4 and a non-wavelength conversion region R5. However, the number of wavelength conversion regions and non-wavelength conversion regions may be changed according to requirements and is not limited thereto.

The wavelength conversion region R4 and the non-wavelength conversion region R5 are disposed along a circumferential direction of the optical wavelength conversion module 103 to surround a rotation shaft S103 of the optical wavelength conversion module 103. The wavelength conversion region R4 is configured to convert the excitation beam B (such as the blue beam) into a conversion beam B1 (such as the red beam, the green beam or a yellow beam) and reflect the conversion beam B1. For example, the wavelength conversion region R4 may be disposed with a light wavelength conversion layer that converts the excitation beam B into the conversion beam B1 (such as the yellow beam) and a reflective layer (such as a metal carrier plate or a reflective coating) that reflects the conversion beam B1. A material of the light wavelength conversion layer may include a phosphor layer, a quantum dot layer, or a combination of the above two materials, but is not limited thereto. In some embodiments, the material of the light wavelength conversion layer may further include light diffusion particles. The light wavelength conversion layer is disposed in the wavelength conversion region R4 and exposes the non-wavelength conversion region R5. That is, the light wavelength conversion layer does not cover the non-wavelength conversion region R5. The non-wavelength conversion region R5 may have light diffusion characteristics. For example, the non-wavelength conversion region R5 may be disposed with a diffuser, but it is not limited thereto. In the embodiment, the optical wavelength conversion module 103 uses the yellow light conversion region as an example for description. However, in other embodiments, the optical wavelength conversion module 103 may also include multiple wavelength conversion regions, such as at least two of a red light conversion region that converts the excitation beam B into the red beam, a green light conversion region that converts the excitation beam B into the green beam, and a yellow light conversion region that converts the excitation beam B into the yellow beam.

The optical wavelength conversion module 103 is configured to rotate around the rotation shaft S103, and the optical wavelength conversion module 103 is configured to synchronously rotate with the filter module 102. In detail, in a first time period, the light penetration region R3 of the filter module 102 and the non-wavelength conversion region R5 of the optical wavelength conversion module 103 cut into a light irradiation region simultaneously. Specifically, the light penetration region R3 of the filter module 102 cuts into the transmission path of the excitation beam B coming from the excitation light source 100. In the first time period, as shown in FIG. 1A, most of the excitation beam B that is transmitted to the filter module 102 passes through the light penetration region R3 of the filter module 102 and is not reflected to the optical wavelength conversion module 103. The homogenizing element 104 is disposed on a transmission path of the excitation beam B that has passed through the filter module 102 to improve uniformity of the beam outputted from the illumination system 10. For example, the homogenizing element 104 is an optical integrator rod, but is not limited thereto. The excitation beam B passing through the filter module 102 passes through the homogenizing element 104, and then is outputted from the illumination system 10. In other words, in the first time period, the beam outputted from the illumination system 10 is the blue beam.

In a second time period, the filtering region R2 of the filter module 102 and the wavelength conversion region R4 of the optical wavelength conversion module 103 cut into the light irradiation region simultaneously. Specifically, the filtering region R2 of the filter module 102 cuts into the transmission path of the excitation beam B coming from the excitation light source 100. As shown in FIG. 1B, the excitation beam B transmitted to the filter module 102 is reflected by the filtering region R2 of the filter module 102. The wavelength conversion region R4 of the optical wavelength conversion module 103 cuts into a transmission path of the excitation beam B reflected by the filtering region R2, and the wavelength conversion region R4 of the optical wavelength conversion module 103 converts the excitation beam B into the conversion beam B1 (such as the yellow beam) and reflects the conversion beam B1. The conversion beam B1 reflected by the wavelength conversion region R4 of the optical wavelength conversion module 103 is transmitted to the filtering region R2 of the filter module 102. A portion of the conversion beam B1 with green color passes through the filtering region R2 (such as the green filter region) of the filter module 102, and the other portion of the conversion beam B1 with red color is filtered by the filtering region R2 of the filter module 102. In other words, the conversion beam B1 coming from the optical wavelength conversion module 103 forms a color beam (such as the green beam) after passing through the filtering region R2 of the filter module 102. The homogenizing element 104 is also disposed on a transmission path of the green beam. The green beam passing through the filter module 102 passes through the homogenizing element 104, and then is outputted from the illumination system 10. In other words, in the second time period, the beam outputted from the illumination system 10 is the green beam.

In a third period, the filtering region R1 of the filter module 102 and the wavelength conversion region R4 of the optical wavelength conversion module 103 cut into the light irradiation region simultaneously. Specifically, the filtering region R1 of the filter module 102 cuts into the transmission path of the excitation beam B coming from the excitation light source 100. As shown in FIG. 1B, the excitation beam B transmitted to the filter module 102 is reflected by the filtering region R1 of the filter module 102. The wavelength conversion region R4 of the optical wavelength conversion module 103 cuts into a transmission path of the excitation beam B reflected by the filtering region R1, and the wavelength conversion region R4 of the optical wavelength conversion module 103 converts the excitation beam B into the conversion beam B1 (such as the yellow beam) and reflects the conversion beam B1. The conversion beam B1 reflected by the wavelength conversion region R4 of the optical wavelength conversion module 103 is transmitted to the filtering region R1 of the filter module 102. A portion of the conversion beam B1 with red color passes through the filtering region R1 (such as the red filter region) of the filter module 102, and the other portion of the conversion beam B1 with green color is filtered by the filtering region R1 of the filter module 102. In other words, the conversion beam B1 coming from the optical wavelength conversion module 103 forms a color beam (such as the red beam) after passing through the filtering region R1 of the filter module 102. The homogenizing element 104 is also disposed on a transmission path of the red beam. The red beam passing through the filter module 102 passes through the homogenizing element 104, and then is outputted from the illumination system 10. In other words, in the third period, the beam outputted from the illumination system 10 is the red beam.

According to the above, the illumination system 10 may divide time into multiple periods (such as the first period to the third period) according to the number of filtering regions and light penetration regions in the filter module 102, and the illumination system 10 outputs beams of different colors (such as the blue beam, the green beam and the red beam) in the different periods. The different color beams constitute the illumination beam ILB shown in FIGS. 1A and 1B. In the embodiment, the illumination system 10 has three periods, and the illumination system 10 respectively outputs the blue beam, the green beam, and the red beam in the three periods. However, the number of periods, the color of the color beam outputted in each period, sequence of the colors of the color beams outputted, and duration of each period may be changed according to requirements.

The illumination system 10 may further include other components according to different requirements. For example, the illumination system 10 may further include multiple lenses (such as a lens 105, a lens 106, a lens 107, and a lens 108) to converge or collimate the beam.

The lens 105 to the lens 108 are disposed on the transmission path of the excitation beam B between the excitation light source 100 and the optical wavelength conversion module 103, and the light guiding element 101 is located between two of the multiple lenses (such as the lens 105 and the lens 106). For example, the lens 105 may be disposed between the excitation light source 100 and the light guiding element 101, and the lenses 106 to 108 may be disposed between the light guiding element 101 and the optical wavelength conversion module 103. Specifically, the lenses 106 to 108 may be disposed on the transmission path of the excitation beam B reflected by the filtering region (the filtering region R1 or the filtering region R2 as shown in FIG. 1C) of the filter module 102 and a transmission path of the conversion beam B1 reflected by the wavelength conversion region R4 of the optical wavelength conversion module 103. For example, as shown in FIG. 1B, the light guiding element 101 may be disposed outside of the transmission path of the excitation beam B reflected by the filtering region of the filter module 102. That is, the light guiding element 101 is not located on the transmission path of the excitation beam B transmitted from the filter module 102 to the optical wavelength conversion module 103. In addition, the lens 106 to the lens 108 may be sequentially disposed on the transmission path of the excitation beam B reflected by the filtering region of the filter module 102, enabling the excitation beam B reflected by the filtering region of the filter module 102 to sequentially pass through the lens 106, the lens 107 and lens 108, and then transmit to the optical wavelength conversion module 103. In addition, the conversion beam B1 reflected by the wavelength conversion region R4 of the optical wavelength conversion module 103 may pass through the lens 108, the lens 107, and the lens 106 sequentially, and then transmit to the filtering region of the filter module 102.

The light valve 12 is disposed on a transmission path of the illumination beam ILB and converts the illumination beam ILB into an image beam IMB. For example, the light valve 12 may be a digital micro-mirror device (DMD), a liquid-crystal-on-silicon panel (LCOS panel), or a transmissive liquid crystal panel, but is not limited thereto.

The projection lens 14 is disposed on a transmission path of the image beam IMB to project the image beam IMB from the projection apparatus 1 onto a screen or other objects on which an image may be formed. The projection lens 14 may be an existing projection lens, which will not be repeated here.

In the embodiment, by adjusting the relative dispositions of the excitation light source 100, the light guiding element 101, the filter module 102, the optical wavelength conversion module 103, and the homogenizing element 104, the excitation beam B coming from the excitation light source 100 may first be transmitted to the filter module 102 through the reflection of the light guiding element 101, and then transmitted to the optical wavelength conversion module 103 through the reflection of the filtering region of the filter module 102 where it is converted into the conversion beam B1 (such as the yellow beam) by the optical wavelength conversion module 103, and the conversion beam B1 is transmitted to the filtering region of the filter module 102 through the reflection of the optical wavelength conversion module 103 and forms the at least one color beam (such as the green beam or the red beam) after passing through the filtering region of the filter module 102. Since the number of the optical elements included in the illumination system 10 can be effectively reduced, at least one of the difficulty in assembly, poor accuracy, and difficulty in size reduction may be improved.

In some embodiments, the design of the incident angle θ1 of the excitation beam B on the light guiding element 101 being less than 45° not only helps to reduce the overall size, but also helps to reduce area of a coating on the light guiding element 101 that reflects the excitation beam B and allows the conversion beam B1 to pass through, thereby reducing the loss due to the conversion beam B1 penetrating the light guiding element 101, or increasing brightness of the projection apparatus 1. In some embodiments, the design of the inclined angle θ1 of the light guiding element 101 being greater than 0° and less than 45° (0°<θ1<45°) also helps to reduce the overall size. In some embodiments, as shown in FIG. 1B, the light guiding element 101 may be disposed obliquely with respect to the filtering region (the filtering region R1 or the filtering region R2 shown in FIG. 1C) of the filter module 102. That is, the light guiding element 101 and the filtering region (the filtering region R1 or the filtering region R2 as shown in FIG. 1C) of the filter module 102 may not be parallel. In addition, the filtering region of the filter module 102 may be disposed obliquely with respect to the wavelength conversion region R4 of the optical wavelength conversion module 103. That is, the filtering region of the filter module 102 and the wavelength conversion region R4 of the optical wavelength conversion module 103 may not be parallel. In addition, an included angle θN formed between an optical axis OX of the excitation beam B coming from the excitation light source 100 and a normal N of the filtering region of the filter module 102 may not be equal to 0°. Furthermore, the normal N of the filtering region of the filter module 102 is not parallel to a central axis CX of the homogenizing element 104.

In the following embodiments, the same or similar elements are denoted by the same or similar reference numerals, and the related descriptions (such as the relative disposition, materials, or functions) of the same elements will not be repeated.

Figure 2A:
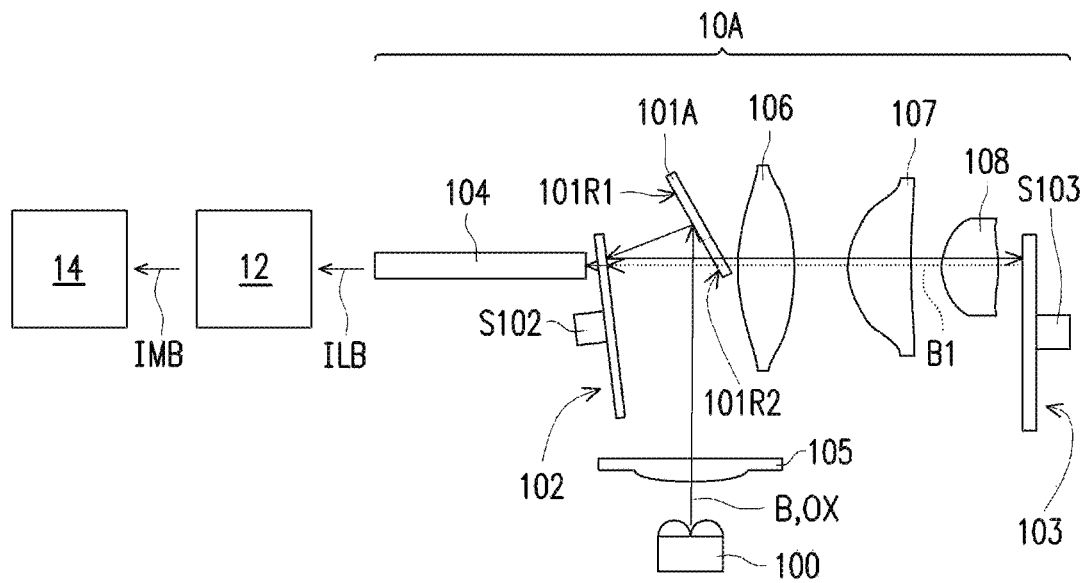
FIG. 2A is a schematic top view of a projection apparatus according to a second embodiment of the disclosure.
Figure 2B:
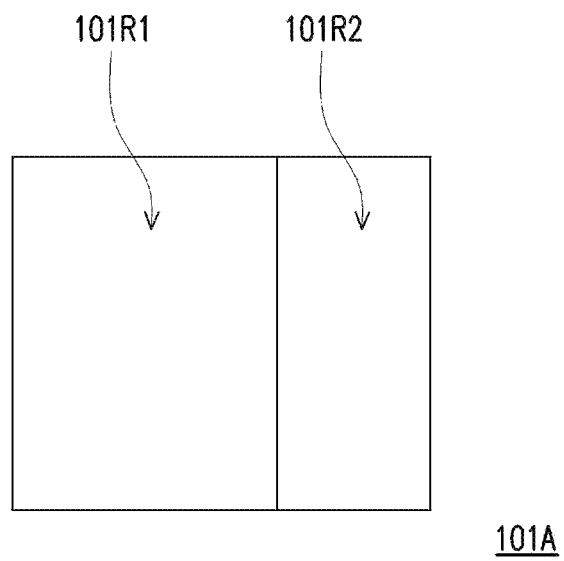
FIG. 2B is a schematic front view of a light guiding element in FIG. 2A.

FIG. 2A is a schematic top view of a projection apparatus according to a second embodiment of the disclosure. FIG. 2B is a schematic front view of a light guiding element in FIG. 2A. With reference to FIGS. 2A and 2B, a main difference between the projection apparatus 1A of the second embodiment and the projection apparatus 1 in FIG. 1B are described as follows. In an illumination system 10A of the projection apparatus 1A, a light guiding element 101A includes a color separation region 101R1 and a light transmission region 101R2. The color separation region 101R1 is disposed on the transmission path of the excitation beam B coming from the excitation light source 100, and is disposed outside of the transmission path of the excitation beam B reflected by the filtering region (the filtering region R1 or the filtering region R2 as shown in FIG. 1C) of the filter module 102. The color separation region 101R1 of the light guiding element 101A reflects the excitation beam B and allows the conversion beam B1 to pass through. The light transmission region 101R2 of the light guiding element 101A is disposed outside of the transmission path of the excitation beam B coming from the excitation light source 100, and is disposed on the transmission path of the excitation beam B reflected by the filtering region of the filter module 102. The light transmission region 101R2 allows the excitation beam B and the conversion beam B1 to pass through. In the embodiment, an area of the color separation region 101R1 is greater than an area of the light transmission region 101R2. In another embodiment, the number, shape, relative disposition or area ratio of the color separation region 101R1 and the light transmission region 101R2 may be changed according to the requirements, and are not limited to those shown in FIG. 2B.

In the embodiment, an area of the light guiding element 101A is greater than a cross-sectional area (a light spot formed by the conversion beam B1) of the conversion beam B1 incident on the light guiding element 101A. In this way, loss of brightness due to light deflection caused by the conversion beam B1 being incident on an edge of the light guiding element 101A may be reduced.

Figure 3:
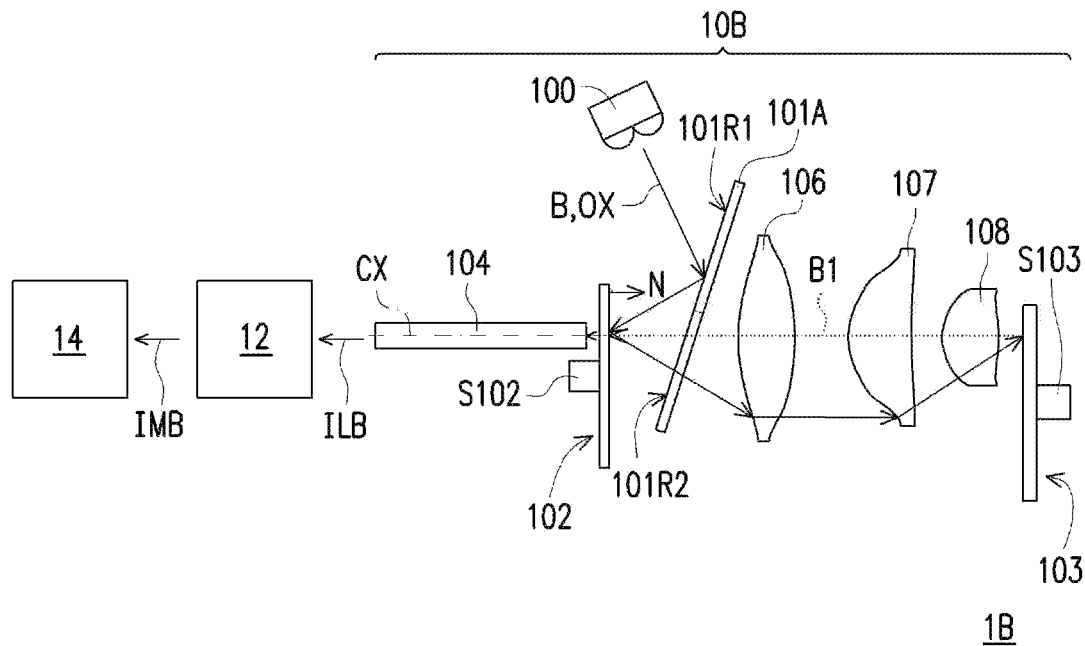
FIGS. 3 to 8 are respectively schematic top views of a projection apparatus according to a third embodiment to an eighth embodiment of the disclosure.

FIG. 3 is a schematic top view of a projection apparatus according to a third embodiment of the disclosure. With reference to FIG. 3, a main difference between a projection apparatus 1B of the third embodiment and the projection apparatus 1A in FIG. 2A lies in the relative disposition of the excitation light source 100, the light guiding element 101A, the filter module 102, and the homogenizing element 104. In an illumination system 10B of the projection apparatus 1B, the excitation light source 100 is disposed on a side close to the color separation region 101R1 of the light guiding element 101A. In addition, the light transmission region 101R2 of the light guiding element 101A is closer to the filter module 102 than the color separation region 101R1 of the light guiding element 101A. In addition, a normal N of the filtering region of the filter module 102 is parallel to a central axis CX of the homogenizing element 104.

It should be noted that although the lens 105 shown in FIG. 2A is omitted in FIG. 3, the illumination system 10B may or may not include the lens 105. Any embodiment of the disclosure may be modified in a same manner, and will not be described in detail below.

Figure 4:
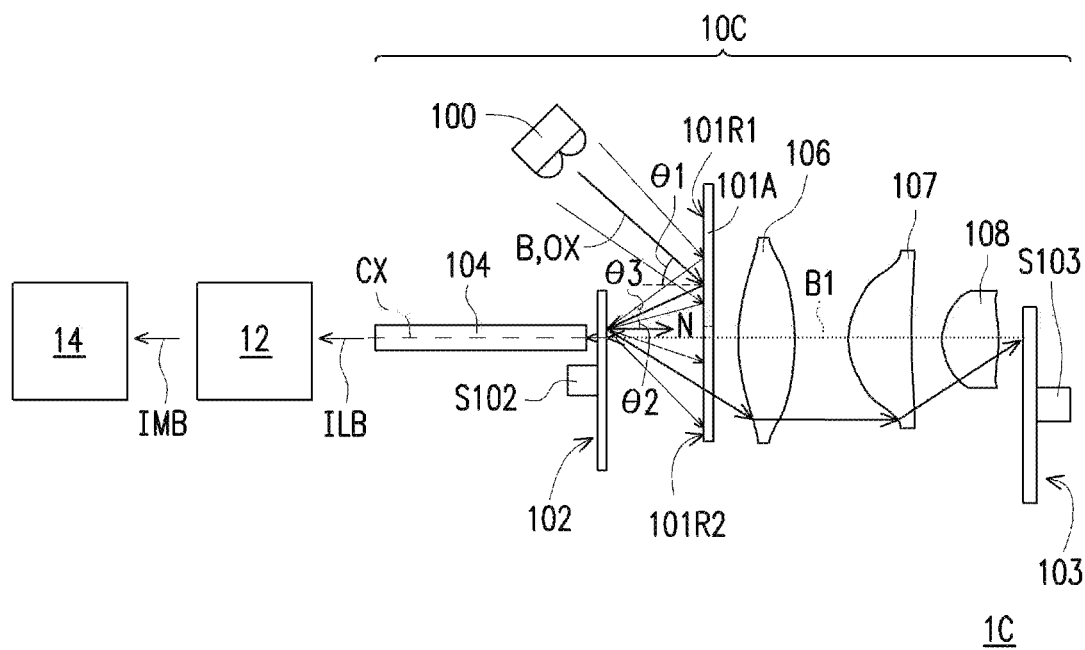

FIG. 4 is a schematic top view of a projection apparatus according to a fourth embodiment of the disclosure. With reference to FIG. 4, main differences between a projection apparatus 1C of the fourth embodiment and the projection apparatus 1B in FIG. 3 are described as follows. In an illumination system 10C of the projection apparatus 1C, the light guiding element 101A and the filtering region (the filtering region R1 or the filtering region R2 as shown in FIG. 1C) of the filter module 102 are parallel. For example, the light guiding element 101A (for example, its incident surface) and the rotation shaft S102 of the filter module 102 are both parallel to the central axis CX of the homogenizing element 104. In addition, an incident angle θ2 of the excitation beam B reflected by the color separation region 101R1 of the light guiding element 101A on the filtering region of the filter module 102 is greater than half of a cone angle (the half of the cone angle is shown as an angle θ3) when the excitation beam B is incident on the filtering region of the filter module 102. That is, θ2>θ3. The half of the cone angle is an included angle formed between a chief ray (shown in bold lines) and an outermost ray (shown in thin lines) in the excitation beam B.

In other embodiments of the disclosure, for example, in an embodiment where the light guiding element 101A and the filtering region (the filtering region R1 or the filtering region R2 as shown in FIG. 1C) of the filter module 102 are not parallel, the θ2>θ3 relationship may also be satisfied.

Figure 5:
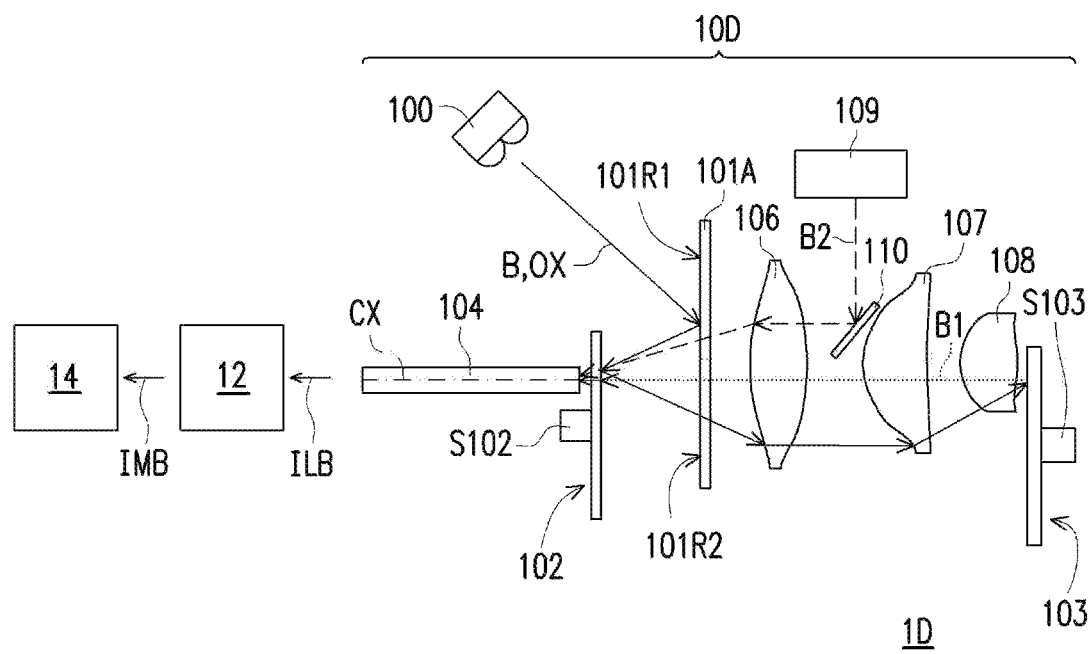

FIG. 5 is a schematic top view of a projection apparatus according to a fifth embodiment of the disclosure. With reference to FIG. 5, a main difference between a projection apparatus 1D of the fifth embodiment and the projection apparatus 1C in FIG. 4 is described as follows. In the projection apparatus 1D, an illumination system 10D further includes an auxiliary light source 109 and a color separation element 110.

The auxiliary light source 109 is configured to emit an auxiliary beam B2. The wavelength of the auxiliary beam B2 is different from the wavelength of the excitation beam B. For example, the auxiliary light source 109 is a red light source, and the auxiliary beam B2 is a red beam.

The color separation element 110 is disposed on a transmission path of the auxiliary beam B2 coming from the auxiliary light source 109 and is located between the light guiding element 101A and the optical wavelength conversion module 103. For example, the color separation element 110 may be disposed between the lens 106 and the lens 107, but is not limited thereto. The color separation element 110 reflects the auxiliary beam B2 and allows the conversion beam B1 to pass through. In addition, the color separation region 101R1 and the light transmission region 101R2 of the light guiding element 101A also allow the auxiliary beam B2 to pass through. In some embodiments, the color separation element 110 may also be designed to reflect the excitation beam B to reduce ratio of the excitation beam B (for example, the excitation beam B that has not been converted into the conversion beam B1 by the wavelength conversion region R4 of the optical wavelength conversion module 103 and is reflected by the wavelength conversion region R4) coming from the optical wavelength conversion module 103 being transmitted to the filter module 102, thereby improving purity of the color beam (such as the red beam) outputted from the illumination system 10D.

The auxiliary light source 109 may be switched on in the third period (a period when the illumination system 10D outputs the red beam), and switched off in other periods. In the third period, after the auxiliary beam B2 coming from the auxiliary light source 109 is reflected by the color separation element 110, the auxiliary beam B2 sequentially passes through the lens 106 and the color separation region 101R1 of the light guiding element 101A, and transmits to the filtering region R1 of the filter module 102. The filtering region R1 of the filter module 102 not only allows the portion of the conversion beam B1 with red color coming from the optical wavelength conversion module 103 to pass through, it also allows the auxiliary beam B2 coming from the auxiliary light source 109 to pass through. The auxiliary beam B2 and the portion of the conversion beam B1 with red color that have passed through the filtering region R1 of the filter module 102 then pass through the homogenizing element 104 and are outputted from the illumination system 10D, thereby providing the purity and brightness of a red beam in the illumination beam.

Figure 6:
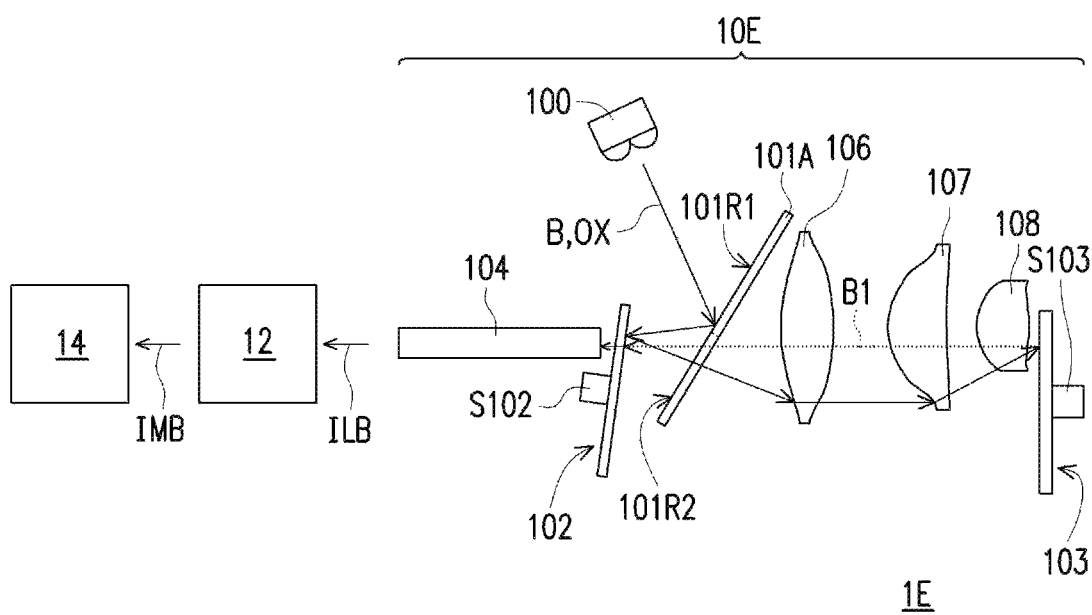

FIG. 6 is a schematic top view of a projection apparatus according to a sixth embodiment of the disclosure. With reference to FIG. 6, a main difference between a projection apparatus 1E of the sixth embodiment and the projection apparatus 1A in FIG. 2A lies in an inclined direction of the filter module 102 and the light guiding element 101A in an illumination system 10E is opposite of an inclined direction of the filter module 102 and the guiding light element 101A in FIG. 2A. In this embodiment, the filter module 102 and the guiding light element 101A are not parallel to each other.

Figure 7:
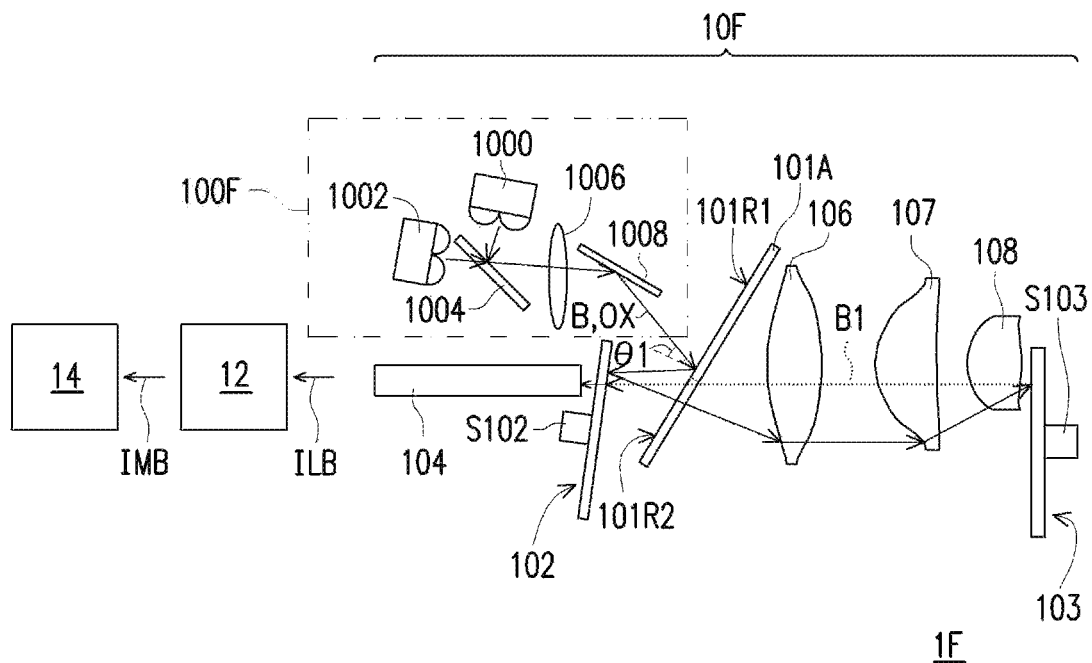

FIG. 7 is a schematic top view of a projection apparatus according to a seventh embodiment of the disclosure. With reference to FIG. 7, main differences between a projection apparatus 1F of the seventh embodiment and the projection apparatus 1E in FIG. 6 are described as follows. In an illumination system 10F of the projection apparatus 1F, an excitation light source 100F includes a light-emitting module 1000, a light-emitting module 1002, a light combining element 1004, a lens 1006, and a reflective element 1008.

The light-emitting module 1000 and the light-emitting module 1002 are respectively configured to emit the excitation beam B. For example, the light-emitting module 1000 and the light-emitting module 1002 each includes multiple light-emitting elements. The multiple light emitting elements may include the multiple laser diodes, the multiple light-emitting diodes, or a combination of the above two light-emitting elements.

The light combining element 1004 is disposed on a transmission path of the excitation beam B coming from the light-emitting module 1000 and a transmission path of the excitation beam B coming from the light-emitting module 1002. The excitation beam B coming from the light-emitting module 1000 and the excitation beam B coming from the light-emitting module 1002 are combined by the light combining element 1004 and transmitted to the lens 1006 through a same transmission path. For example, the excitation beam B coming from the light-emitting module 1000 is in a P polarization state, while the excitation beam B coming from the light-emitting module 1002 is in a S polarization state, and the light combining element 1004 is, for example, a polarization element that allows the excitation beam B in the S polarization state to pass through and reflects the excitation beam B in the P polarization state. The lens 1006 is disposed on the transmission path of the excitation beam B combined by the light combining element 1004 and transmits the excitation beam B combined by the light combining element 1004 to the reflective element 1008. The reflective element 1008 reflects the excitation beam B coming from the lens 1006 to the light guiding element 101A.

In the embodiment, the incident angle θ1 of the excitation beam B coming from the light combining element 104 on the light guiding element 101 may be greater than 9° and less than 40°. In some embodiments, the size and the brightness may be optimized when the incident angle θ1 is greater than 15° and less than 25°.

Figure 8:
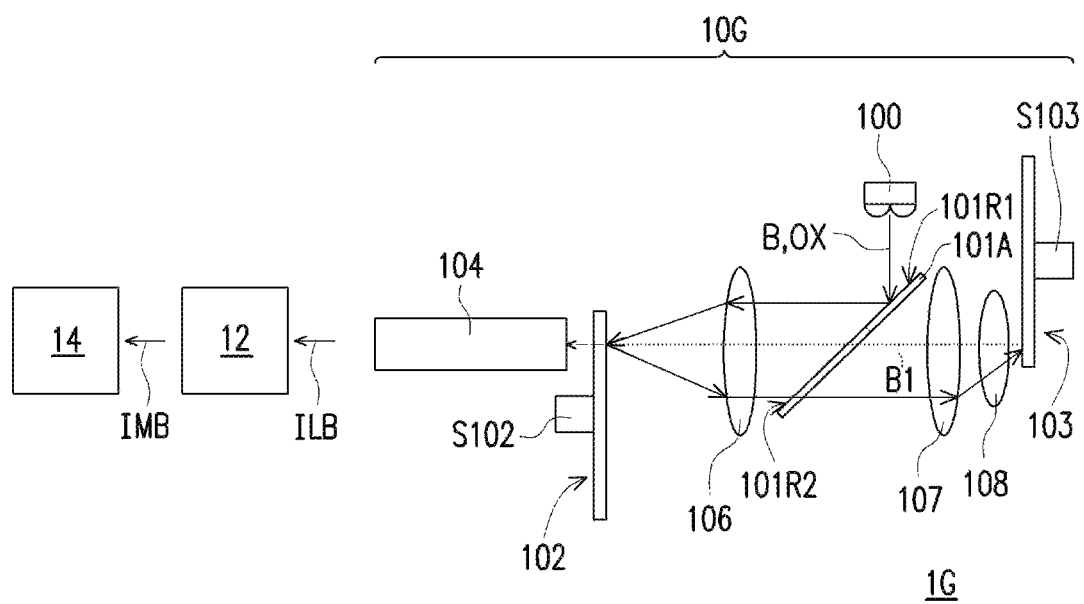

FIG. 8 is a schematic top view of a projection apparatus according to an eighth embodiment of the disclosure. With reference to FIG. 8, main differences between a projection apparatus 1G of the eighth embodiment and the projection apparatus 1B in FIG. 3 are described as follows. In an illumination system 10G of the projection apparatus 1G, the light guiding element 101A is disposed between the lens 106 and the lens 107. The excitation beam B coming from the excitation light source 100 passes through the lens 106 and is transmitted to the filtering region (the filtering region R1 or the filtering region R2 as shown in FIG. 1C) of the filter module 102 after reflection by the color separation region 101R1 of the light guiding element 101A. The excitation beam B reflected by the filtering region of the filter module 102 sequentially passes through the lens 106, the light transmission region 101R2 of the light guiding element 101A, the lens 107, and the lens 108 and is transmitted to the wavelength conversion region R4 of the optical wavelength conversion module 103. The conversion beam B1 reflected by the wavelength conversion region R4 of the optical wavelength conversion module 103 sequentially passes through the lens 108, the lens 107, the light transmission region 101R2 (or the color separation region 101R1) of the light guiding element 101A, the lens 106, and the filtering region of the filter module 102 and forms the at least one color beam (such as the red beam or the green beam).

In summary, the embodiments of the disclosure have at least one of the following advantages or effects. In the illumination system and the projection apparatus according to the embodiment of the disclosure, the excitation beam coming from the excitation light source may first be transmitted to the filter module through the reflection of the light guiding element, and then transmitted to the optical wavelength conversion module through the reflection of the filtering region of the filter module, where it is converted into the conversion beam by the optical wavelength conversion module. The conversion beam is transmitted to the filtering region of the filter module through the reflection of the optical wavelength conversion module and forms the at least one color beam after passing through the filtering region of the filter module. Since the number of the optical elements included in the illumination system can be effectively reduced, at least one of the difficulty in assembly, poor accuracy, and difficulty in size reduction may be improved. In some embodiments, the overall size can be reduced and the brightness of the projection apparatus can be increased by the design of the incident angle θ1 of the excitation beam B on the light guiding element 101 being less than 45°. In some embodiments, the overall size can be reduced by the design of the inclined angle θI of the light guiding element 101 being greater than 0° and less than 45° (0°<θI<45°). In some embodiments, the area of the light guiding element may be greater than the cross-sectional area of the conversion beam incident on the light guiding element to reduce the loss of brightness of the conversion beam. In some embodiments, the brightness and the purity of the color beam (such as the red beam) outputted from the illumination system can be improved by the disposition of the auxiliary light source and the color separation element that reflects the excitation beam and the auxiliary beam.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection apparatus, comprising an illumination system, a light valve, and a projection lens, wherein the illumination system is configured to provide an illumination beam, the light valve is disposed on a transmission path of the illumination beam and converts the illumination beam into an image beam, and the projection lens is disposed on a transmission path of the image beam, wherein the illumination system comprises an excitation light source, a light guiding element, a filter module, an optical wavelength conversion module, and a homogenizing element, wherein the excitation light source is configured to emit an excitation beam, the light guiding element is disposed on a transmission path of the excitation beam coming from the excitation light source and is configured to reflect the excitation beam coming from the excitation light source, the filter module comprises a filtering region and is disposed on a transmission path of the excitation beam reflected by the light guiding element, the optical wavelength conversion module comprises a wavelength conversion region and is disposed on a transmission path of the excitation beam reflected by the filtering region of the filter module, and the wavelength conversion region of the optical wavelength conversion module is configured to convert the excitation beam into a conversion beam and reflect the conversion beam, wherein a wavelength of the conversion beam is different from a wavelength of the excitation beam, and the homogenizing element is disposed on a transmission path of the excitation beam that has passed through the filter module, the conversion beam coming from the optical wavelength conversion module forms at least one color beam after passing through the filtering region of the filter module, and the homogenizing element is disposed on a transmission path of the at least one color beam, wherein the light guiding element comprises:

a color separation region, disposed on the transmission path of the excitation beam coming from the excitation light source, and disposed outside of the transmission path of the excitation beam reflected by the filtering region of the filter module, wherein the color separation region reflects the excitation beam and allows the conversion beam to pass through; and a light transmission region, disposed outside of the transmission path of the excitation beam coming from the excitation light source, and disposed on the transmission path of the excitation beam reflected by the filtering region of the filter module, wherein the light transmission region allows the excitation beam and the conversion beam to pass through.

2. The projection apparatus according to claim 1, wherein the light guiding element is disposed outside of the transmission path of the excitation beam reflected by the filtering region of the filter module.

3. The projection apparatus according to claim 1, wherein an incident angle of the excitation beam on the light guiding element is $\theta 1$, and $\theta 1 > 0°$, an incident angle of the excitation beam reflected by the color separation region on the filtering region of the filter module is $\theta 2$, and half of a cone angle when the excitation beam is incident on the filtering region of the filter module is $\theta 3$, and $\theta 2 > \theta 3$.

4. The projection apparatus according to claim 1, wherein the illumination system further comprises:

an auxiliary light source, configured to emit an auxiliary beam, wherein a wavelength of the auxiliary beam is different from the wavelength of the excitation beam; and a color separation element, disposed on a transmission path of the auxiliary beam coming from the auxiliary light source and located between the light guiding element and the optical wavelength conversion module, wherein the color separation element reflects the excitation beam and the auxiliary beam, and allows the conversion beam to pass through, and a color separation region and a light transmission region allow the auxiliary beam to pass through.

5. The projection apparatus according to claim 1, wherein an included angle formed between an optical axis of the excitation beam coming from the excitation light source and a normal of the filtering region of the filter module is not equal to 0°.

6. The projection apparatus according to claim 1, wherein the light guiding element is not parallel to the filtering region of the filter module.

7. The projection apparatus according to claim 1, wherein an incident angle of the excitation beam on the light guiding element is $\theta 1$, and $0° < \theta 1 < 45°$, and an inclined angle of the light guiding element is greater than 0° and less than 45°.

8. The projection apparatus according to claim 1, wherein the illumination system further comprises a plurality of lenses, disposed between the filter module and the optical wavelength conversion module, wherein the light guiding element is located between two of the plurality of lenses.

9. A projection apparatus, comprising an illumination system, a light valve, and a projection lens, wherein the illumination system is configured to provide an illumination beam, the light valve is disposed on a transmission path of the illumination beam and converts the illumination beam into an image beam, and the projection lens is disposed on a transmission path of the image beam, wherein the illumination system comprises an excitation light source, a light guiding element, a filter module, an optical wavelength conversion module, and a homogenizing element, wherein the excitation light source is configured to emit an excitation beam, the light guiding element is disposed on a transmission path of the excitation beam coming from the excitation light source and is configured to reflect the excitation beam coming from the excitation light source, the filter module comprises a filtering region and is disposed on a transmission path of the excitation beam reflected by the light guiding element, the optical wavelength conversion module comprises a wavelength conversion region and is disposed on a transmission path of the excitation beam reflected by the filtering region of the filter module, and the wavelength conversion region of the optical wavelength conversion module is configured to convert the excitation beam into a conversion beam and reflect the conversion beam, wherein a wavelength of the conversion beam is different from a wavelength of the excitation beam, and the homogenizing element is disposed on a transmission path of the excitation beam that has passed through the filter module, the conversion beam coming from the optical wavelength conversion module forms at least one color beam after passing through the filtering region of the filter module, and the homogenizing element is disposed on a transmission path of the at least one color beam, wherein an incident angle of the excitation beam on the light guiding element is θ1, and θ1>0°, the excitation beam and the at least one color beam constitute the illumination beam, and the light guiding element is parallel to the filtering region of the filter module.

10. An illumination system, configured to provide an illumination beam, comprising an excitation light source, a light guiding element, a filter module, and an optical wavelength conversion module, wherein
the excitation light source is configured to emit an excitation beam,
the light guiding element is disposed on a transmission path of the excitation beam coming from the excitation light source and is configured to reflect the excitation beam coming from the excitation light source,
the filter module comprises a filtering region and is disposed on a transmission path of the excitation beam reflected by the light guiding element, and
the optical wavelength conversion module comprises a wavelength conversion region and is disposed on a transmission path of the excitation beam reflected by the filtering region of the filter module, and the wavelength conversion region of the optical wavelength conversion module is configured to convert the excitation beam into a conversion beam and reflect the conversion beam, wherein a wavelength of the conversion beam is different from a wavelength of the excitation beam, and the light guiding element comprises:
a color separation region, disposed on the transmission path of the excitation beam coming from the excitation light source, and disposed outside of the transmission path of the excitation beam reflected by the filtering region of the filter module, wherein the color separation region reflects the excitation beam and allows the conversion beam to pass through; and
a light transmission region, disposed outside of the transmission path of the excitation beam coming from the excitation light source, and disposed on the transmission path of the excitation beam reflected by the filtering region of the filter module, wherein the light transmission region allows the excitation beam and the conversion beam to pass through.

11. The illumination system according to claim 10, wherein the light guiding element is disposed outside of the transmission path of the excitation beam reflected by the filtering region of the filter module.

12. The illumination system according to claim 10, wherein an incident angle of the excitation beam on the light guiding element is θ1, and θ1>0° an incident angle of the excitation beam reflected by the color separation region on the filtering region of the filter module is θ2, and half of a cone angle when the excitation beam is incident on the filtering region of the filter module is θ3, and θ2>θ3.

13. The illumination system according to claim 10, further comprising:
an auxiliary light source, configured to emit an auxiliary beam, wherein a wavelength of the auxiliary beam is different from the wavelength of the excitation beam; and
a color separation element, disposed on a transmission path of the auxiliary beam coming from the auxiliary light source and located between the light guiding element and the optical wavelength conversion module, wherein the color separation element reflects the excitation beam and the auxiliary beam, and allows the conversion beam to pass through, and a color separation region and a light transmission region allow the auxiliary beam to pass through.

14. The illumination system according to claim 10, wherein an included angle formed between an optical axis of the excitation beam coming from the excitation light source and a normal of the filtering region of the filter module is not equal to 0°.

15. The illumination system according to claim 10, wherein the light guiding element is not parallel to the filtering region of the filter module.

16. The illumination system according to claim 10, wherein an incident angle of the excitation beam on the light guiding element is θ1, and 0°<θ1<45°, and an inclined angle of the light guiding element is greater than 0° and less than 45°.

17. The illumination system according to claim 10, further comprising:
a plurality of lenses, disposed between the filter module and the optical wavelength conversion module, wherein the light guiding element is located between two of the plurality of lenses.

18. The illumination system according to claim 10, further comprising:
a homogenizing element, disposed on a transmission path of the excitation beam that has passed through the filter module, the conversion beam coming from the optical wavelength conversion module forms at least one color beam after passing through the filtering region of the filter module, and the homogenizing element is disposed on a transmission path of the at least one color beam.

19. An illumination system, configured to provide an illumination beam, comprising an excitation light source, a light guiding element, a filter module, and an optical wavelength conversion module, wherein
the excitation light source is configured to emit an excitation beam,
the light guiding element is disposed on a transmission path of the excitation beam coming from the excitation light source and is configured to reflect the excitation beam coming from the excitation light source,
the filter module comprises a filtering region and is disposed on a transmission path of the excitation beam reflected by the light guiding element,
the optical wavelength conversion module comprises a wavelength conversion region and is disposed on a transmission path of the excitation beam reflected by the filtering region of the filter module, and the wavelength conversion region of the optical wavelength conversion module is configured to convert the excitation beam into a conversion beam and reflect the conversion beam, wherein a wavelength of the conversion beam is different from a wavelength of the excitation beam, and the light guiding element is parallel to the filtering region of the filter module.

* * * * *